United States Patent [19]

Kleynjans

[11] Patent Number: 4,574,542
[45] Date of Patent: Mar. 11, 1986

[54] DOCK SEAL CONSTRUCTION

[75] Inventor: Joseph P. H. Kleynjans, Coraopolis, Pa.

[73] Assignee: Flexion, Inc., Pittsburgh, Pa.

[21] Appl. No.: 682,273

[22] Filed: Dec. 12, 1984

[51] Int. Cl.$^4$ .................. E04H 9/14; E04H 14/00
[52] U.S. Cl. .................. 52/173 DS; 160/191
[58] Field of Search .......... 52/173 DS, 2 D; 49/485; 14/71.1, 71.5; 160/190, 191

[56] References Cited

U.S. PATENT DOCUMENTS

| 3,181,205 | 5/1965 | Frommelt et al. | |
| 3,230,675 | 1/1966 | Frommelt et al. | |
| 3,286,417 | 11/1966 | Dazzo. | |
| 3,375,625 | 4/1968 | Edkins et al. | |
| 3,403,489 | 10/1968 | Frommelt et al. | 52/173 DS |
| 3,500,599 | 3/1970 | Sciolino. | |
| 3,665,997 | 5/1972 | Smith et al. | 52/173 DS |
| 3,792,559 | 2/1974 | Frommelt et al. | 52/173 DS |
| 3,854,257 | 12/1974 | Lobel | 52/173 DS |
| 3,896,517 | 7/1975 | Bigelow, Jr. | 14/71.5 |
| 4,038,729 | 8/1977 | McGuire et al. | 52/173 DS X |
| 4,213,279 | 7/1980 | Layne. | |
| 4,349,992 | 9/1982 | Layne | 52/173 DS |
| 4,494,341 | 1/1985 | Schwab | 52/173 DS |

FOREIGN PATENT DOCUMENTS 958956 12/1974 Canada ..................... 52/173 DS

Primary Examiner—Carl D. Friedman
Assistant Examiner—Richard E. Chilcot, Jr.
Attorney, Agent, or Firm—Joseph P. Gastel

[57] ABSTRACT

A dock seal construction for a building having a door opening and side wall portions located to the sides of the door opening, the dock seal including a pair of elongated pad members secured on the side wall portions, a resilient flexible core in each of the pad members, a casing surrounding a substantial portion of the peripheries of the pad members, with the pad members each having an inclined outer side spaced from its respective side wall portion which extends at a slant toward the door opening so as to provide a relatively small amount of flexible core which is compressed by the rear of a truck.

10 Claims, 20 Drawing Figures

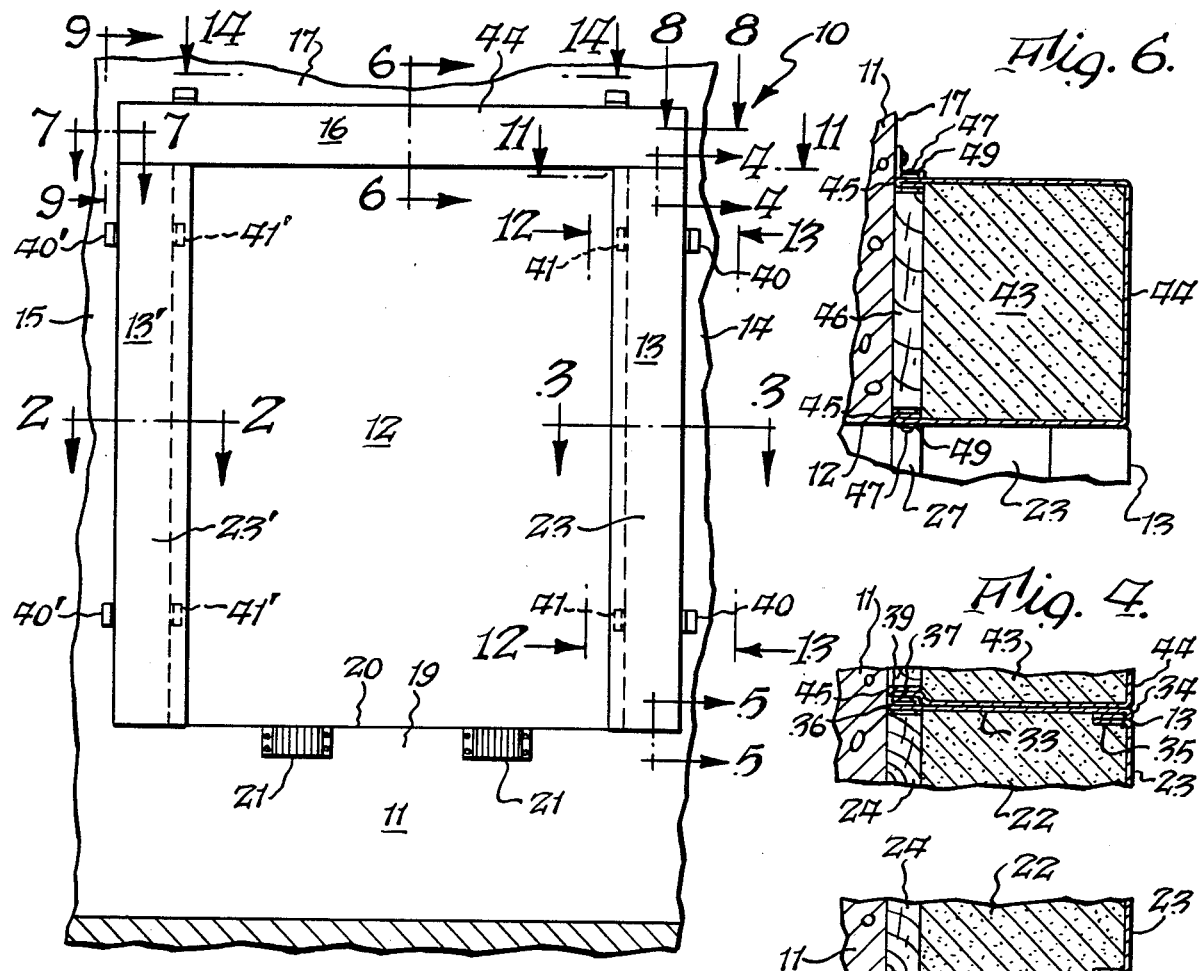

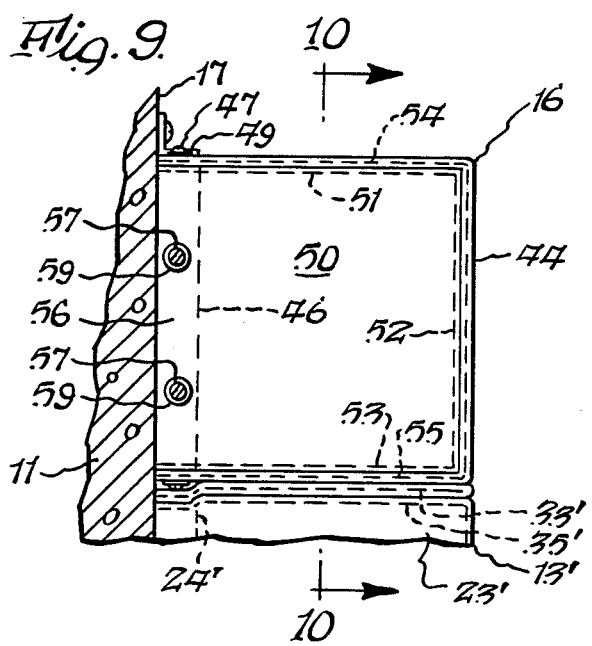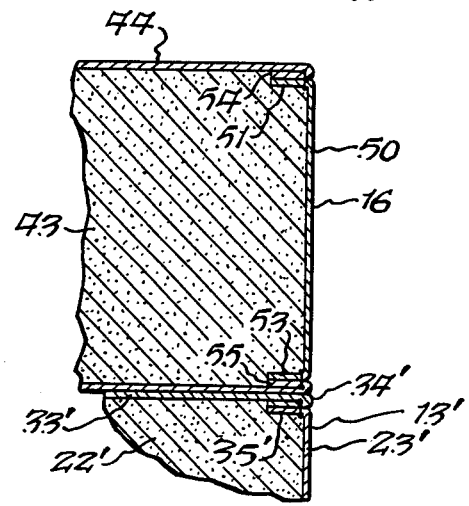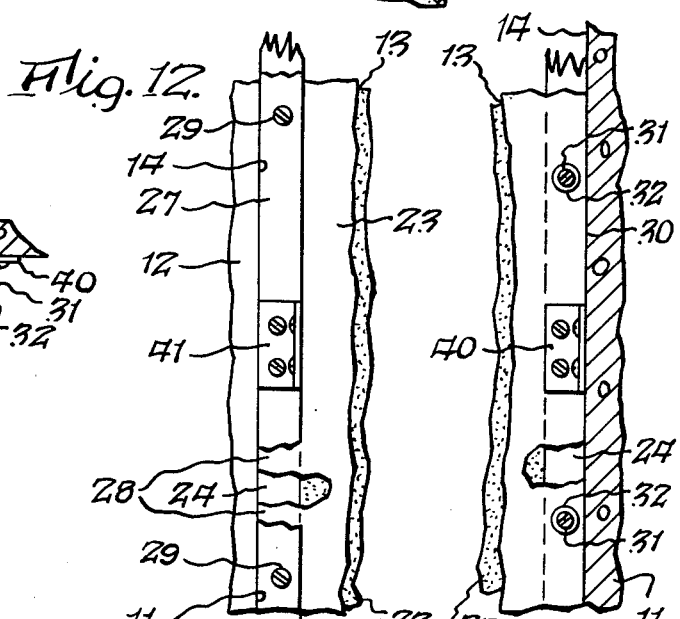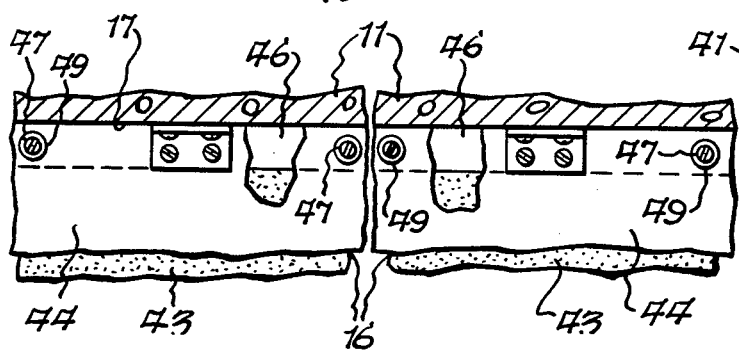

DOCK SEAL CONSTRUCTION

BACKGROUND OF THE INVENTION

The present invention relates to an improved dock seal construction which does not deteriorate in use as rapidly as prior art constructions.

By way of background, prior art dock seals included flexible resilient side pads which were compressed when engaged by the rear edges of a truck. The side pads included a portion of uniform thickness between the wall of a building and the rear of a truck. The side pads were compressed an excessive amount in use, and this caused the flexible resilient foam core to deteriorate rapidly, thereby requiring the side pads, to be replaced frequently. It is with overcoming the foregoing deficiency of the prior art that the present invention is concerned.

SUMMARY OF THE INVENTION

It is one object of the present invention to provide an improved dock seal construction which has a relatively long useful life because its foam core does not deteriorate rapidly in use.

Another object of the present invention is to provide an improved dock seal construction having pad members which are compressed relatively small amounts under all conditions of operation.

A further object of the present invention is to provide an improved dock seal which is compressed a relatively small amount even when the truck engaging it is offcenter relative to an associated doorway. Other objects and attendant advantages of the present invention will readily be perceived hereafter.

The present invention relates to an improved dock seal construction for sealing the space between the rear of the sides of a truck and the side wall portions of a building located to the sides of a door opening comprising a pair of elongated pad members each having a longitudinal axis, means for securing one of said elongated pad members to each of said side wall portions proximate said door opening with said longitudinal axes being substantially parallel to each other, each of said elongated pad members having a resilient flexible core with a periphery, each of said pad members having first and second sides extending outwardly from its respective side wall portion and each having a third side intersecting said first and second sides and spaced from its respective side wall portion and extending at a slant toward said door opening so as to intersect the rear of the sides of a truck at an acute angle when said pads are in an unstressed condition.

The present invention also relates to a pad member for a dock seal construction for sealing the space between the rear of a truck and the wall of a building surrounding a door opening comprising an elongated pad member having a longitudinal axis, said elongated pad member including a resilient flexible core with a periphery, said pad member having four sides, with first and second of said sides being substantially perpendicular to each other and third and fourth sides being at an acute angle relative to each other, said third side also being at an acute angle relative to said second side, and said fourth side being at an obtuse angle relative to said first side.

The various aspects of the present invention will be more fully understood when the following portions of the specification are read in conjunction with the accompanying drawings wherein:

BRIEF DESCRIPTION OF THE DRAWINGS

FIG. 1 is a front elevational view of the improved dock seal of the present invention installed relative to a door opening of a loading dock of a building;

FIG. 2 is a fragmentary cross sectional view taken substantially along line 2—2 of FIG. 1 and showing the cross section of the seal and its relationship to the building wall and door opening;

FIG. 3 is a view similar to FIG. 2 but taken along line 3—3 of FIG. 1;

FIG. 4 is a fragmentary cross sectional view taken substantially along line 4—4 of FIG. 1 and showing the junction between the side pad and the head pad and certain pertinent structure thereof;

FIG. 5 is a fragmentary cross sectional view taken substantially along line 5—5 of FIG. 1 and showing the structure of the bottom of the side pad;

FIG. 6 is a fragmentary cross sectional view taken substantially along line 6—6 of FIG. 1 and showing primarily the structure of the head pad;

FIG. 7 is a fragmentary cross sectional view taken substantially along line 7—7 and showing a detail of the construction of the left end of the head pad;

FIG. 8 is a fragmentary cross sectional view taken substantially along line 8—8 of FIG. 1 and showing a detail of the construction of the right end of the head pad;

FIG. 9 is a view taken in the direction of arrows 9—9 of FIG. 1 and showing the left end of the head pad and the adjacent portion of the side pad.

FIG. 10 is a fragmentary cross sectional view taken substantially along line 10—10 of FIG. 9;

FIG. 11 is a view taken in the direction of arrows 11—11 of FIG. 1 and showing the structure at the top of the right side pad;

FIG. 12 is a fragmentary cross sectional view with parts broken away taken substantially in the direction of arrows 12—12 of FIG. 1 and showing the structure at the edge of the side pad adjacent the building;

FIG. 13 is a fragmentary cross sectional view with parts broken away taken substantially along line 13—13 of FIG. 1 and showing structure at the outer side of the right side pad;

FIG. 14 is a fragmentary cross sectional view with parts broken away taken substantially along line 14—14 of FIG. 1 and showing the structure at the top of the head pad;

DESCRIPTION OF THE PREFERRED EMBODIMENTS

Figure 15:
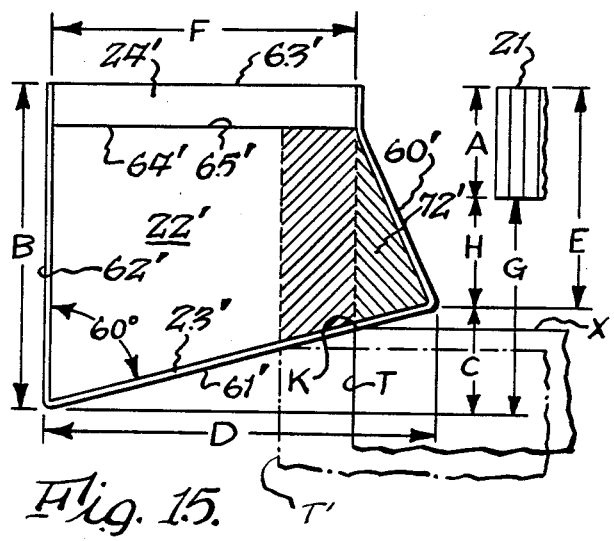
FIG. 15 is a fragmentary schematic view showing the relationship between the side pad and the edges of both an 8 foot wide truck and an 8½ foot wide truck properly centered relative to the side pad.

The improved dock seal 10 of the present invention is shown mounted on a building wall 11 surrounding door opening 12. More specifically, the dock seal includes elongated pad members 13 and 13' mounted on building side wall portions 14 and 15, respectively, located to the sides of door opening 12 and it also includes an elongated head pad 16 mounted on building wall portion 17 located above door opening 12. The building wall includes a portion 19 which is below floor 20. Bumpers 21 are mounted on wall portion 19. The rear of the floor of a truck abuts bumpers 19 when a truck is backed against dock seal 10, and bumpers 21 act as stops for the rear of the truck, thereby limiting the amount which pad members 13, 13' and 16 can be compressed. Pad members 13 and 13' are mirror image counterparts of each other. Therefore, all parts of pad member 13 will be designated with unprimed numerals and corresponding parts of pad member 13' will be designed by the same numerals which are primed.

Elongated pad members 13 and 13' have longitudinal axes which are substantially parallel to each other and include cores 22 and 22', respectively, of suitable resilient flexible foam material which is preferably polyurethane foam, but which may be any other suitable foam. Casings 23 and 23' extend around three sides of cores 22 and 22', respectively, and are of a wear-resistant waterproof material which is known under the trademark HYPALON, but it can be of any other suitable material. Elongated boards 24 and 24' are located in contiguous relationship to the fourth sides of cores 22 and 22', respectively, and the ends of casings 23 and 23' are secured to boards 24 and 24', respectively. In this respect, as can be seen from FIGS. 2 and 3, staples 25 and 25', respectively, secure edge portions of casings 23 and 23', respectively, to the rears 26 and 26', respectively, of boards 24 and 24', respectively. A metal strip 27 extends for the entire length of board 24 and bears against the edge portion 28 of casing 23. Metal strip 27 is secured to board 24 by spaced screws 29 which are located on approximate sixteen inch centers. The opposite edge portion of casing 23 is folded over on itself at 30 (FIG. 3) and is secured to board 24 by spaced screws 31 which are on approximate twelve inch centers and extend through grommets 32 (FIG. 13). Pad member 13' has mirror image counterpart structure which is designated by the same numerals which were applied to pad member 13, but which are primed.

An end panel 33 (FIG. 11) is sewn to the casing 23 in the manner shown in FIG. 4 wherein end portion 34 is folded over on itself and is sewn by a row of stitching to the folded over edge 35 of casing 23. The edge portion 36 (FIG. 11) of panel 33 which overlies the top edge of board 24 is secured to the latter by means of screws 37 which pass through grommets 39. The bottom panel 33a (FIG. 5) is the mirror image of panel 33 (FIG. 11) and is secured to casing 23 and board 24 in the same manner as described above relative to top panel 33 (FIG. 4). It will be appreciated that for simplicity of illustration, in certain portions of the specification references are made to parts with primed numerals and in other portions of the specification references are made to parts having unprimed numerals. Where the primed and unprimed numerals refer to mirror image counterparts, it will be appreciated that where reference is only made to either the primed or the unprimed numerals, there is structure corresponding to the other of the primed or unprimed numerals, even though such parts are not specifically illustrated.

Pad member 13 is attached to wall portion 15 by right angle brackets 40 and 41 (FIGS. 1, 12 and 13) and by screws (not numbered) which extend into wall portion 15 and board 24. Pad member 13' is secured to wall portion 14 by right angle brackets 41' and 40' which are mirror image counterparts of brackets 41 and 40, respectively.

Head pad 16 is secured to wall portion 17 and its ends are in contiguous abutting relationship with the tops of pad members 13 and 13'. Head pad 16 includes a polyurethane foam core 43 having a casing 44 of wear-resistant material, such as that known under the trademark HYPALON. Core 43 is of rectangular solid configuration. The opposite edges of casing 44 are folded over as shown at 45 (FIG. 6) and are secured to board 46 by means of screws 47 which extend through grommets 49. An end panel 50 (FIG. 9) has its edge portions 51, 52 and 53 folded inwardly (FIGS. 9 and 10) and secured to folded-in edges 54 and 55 of casing 44 by suitable stitching. The edge portion 56 (FIGS. 7 and 9) of panel 50 is secured to board 46 by means of screws 57 which extend through grommets 59. A panel 50' (FIG. 7) is the mirror image counterpart of panel 50 and it covers the opposite end of core 43 in the same manner as described relative to end panel 50.

In accordance with the present invention, the pad members 13 and 13' are of the cross sectional configuration shown in FIGS. 2, 3, 11 and 15. As can be seen from FIG. 15, pad member 13' includes movable sides 60', 61' and 62'. Side 63' is rigid and is the outside surface of board 24'. Side 65' of core 22' is in contiguous abutting relationship with surface 64' of board 24'. Side 62' is substantially perpendicular to side 63'. Side 61' extends at an acute angle to side 62' and also extends at an acute angle to side 60' which extends at an obtuse angle relative to side 65'. The angle between sides 61' and 62' is approximately 60° but it may be any other suitable angle which achieves the objective of the present invention.

For a fuller understanding of the present invention representative dimensions of pad 22' are given as follows: Dimension A, which is the thickness of bumper 21, is four inches. Dimension B is approximately twelve inches. Dimension C is four inches. Dimension D is approximately fifteen inches. Dimension E is approximately eight inches, and dimension F is approximately twelve inches. It will be appreciated that the foregoing dimensions are solely for illustrative purposes and that departures may be made from the foregoing dimensions while still retaining the basic concept of the present invention.

Figure 16:
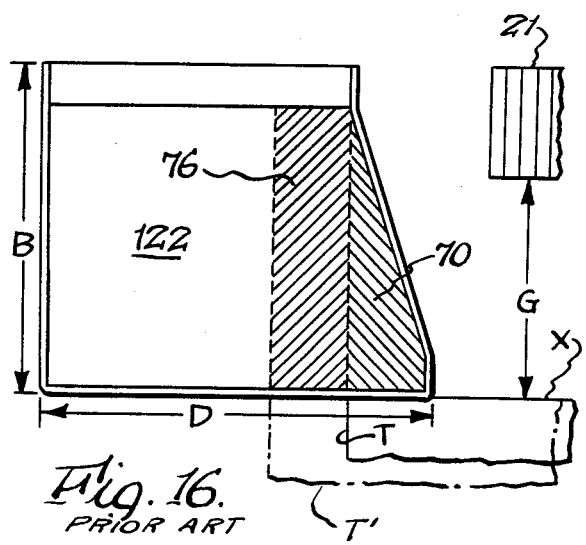
FIG. 16 is a view similar to FIG. 15 but showing the relationship between the outer edge of both an 8 foot wide truck and an 8½ foot wide truck and a prior art side pad.

In accordance with the present invention, the cross sectional contours of pads 22 and 22' are as described above relative to FIGS. 2, 3 and 15 for a plurality of reasons. First of all, the above-described dimensions prolong the life of the cores 22 and 22' under a plurality of different conditions, namely, under the conditions wherein (1) they are abutted in their intended places by the rear ends of trucks which are 8 feet wide, and (2) when they are abutted squarely in their intended places by trucks which are 8½ feet wide, and (3) when they are abutted by any trucks which are offcenter relative to pad members 13 and 13'. The foregoing can be more readily seen when the compression of core 22' of the present invention (FIG. 15) is compared to the compression of prior art core 122 (FIG. 16) under like circumstances. The cores 22' and 122 are shown in their normal unstressed conditions in FIGS. 15 and 16, with the rear end of 8 foot wide truck T and 8½ foot wide truck T' about to distort them from their normal unstressed conditions. A comparison of FIGS. 15 and 16, as shown by the cross-hatched areas, demonstrates that more of the prior art core 122 is subject to compression that the amount of core 22' of the present invention.

Figure 17:
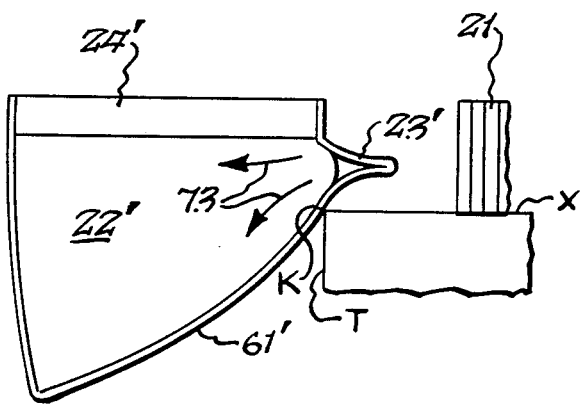
FIG. 17 is a schematic view showing the manner in which the improved pad of the present invention compresses when it is distorted by the rear edge of an 8 foot wide truck.

The manner in which core 22' of the present invention is distorted is shown in FIG. 17. As can be seen, the core 22' is compressed less than core 122 when both are distorted by a truck T which is 8 feet wide and which is centered between the pads on opposite sides of a door opening. The reason for this is that prior art core 122 must be distorted eight inches (distance G) when the rear end X of truck T abuts bumper 21. Thus, the cross-hatched area 70 of core 122 must be compressed from the condition shown in FIG. 16 to the condition shown at 70a in FIG. 18 because it must be compressed eight inches. Furthermore, this compression places a tremendous stress on the portion of core 122 shown designated by the crosshatched area 71 in FIG. 18. The intermittent extreme distortion of prior art core 122 causes it to disintegrate within about one year of use.

Figure 18:
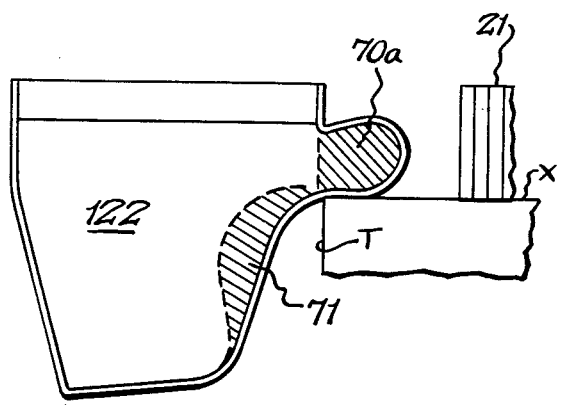
FIG. 18 is a schematic view which is analogous to FIG. 17 but showing the manner in which a prior art side pad compresses when distorted by the rear edge of an 8 foot wide truck.

In contrast to the distortion of prior art core 122, the core 22' of the present invention is distorted much less and therefore it can last much longer. In this respect, the cross hatched area 72' of core 22' is deflected only four inches (dimension H) when the end X of truck T abuts bumper 21. Thus, there is less deteriorating compression applied to core 22. In addition, since side 61' extends at an angle to the corner K of truck T, the vector forces applied to core 22' tend to cause it to recede in the direction of arrows 73 (FIG. 17), thereby forcing it out of the way. In addition, since side 60' extends at an acute angle relative to side 61', there is even less core material compressed behind the truck. Furthermore, a stressed area, such as 71 of FIG. 18, is not experienced when core 22' is deflected as shown in FIG. 17. In addition to the foregoing, it can be seen that the casing 23' merely shows a slight portion overlapping the end of the truck (FIG. 17) whereas the prior art of FIG. 18 shows a relatively large portion which also contains a part of the core 122. If the portion of casing 23' of FIG. 17 is struck by a fork lift or the like moving into or out of the truck, it will merely deflect out of the way in most instances. However, if the bulbous portion shown at 70a in FIG. 18 is struck by a fork lift or a carton, there is more likelihood that it will tear because the compressed foam offers great resistance against deflection.

Figure 19:
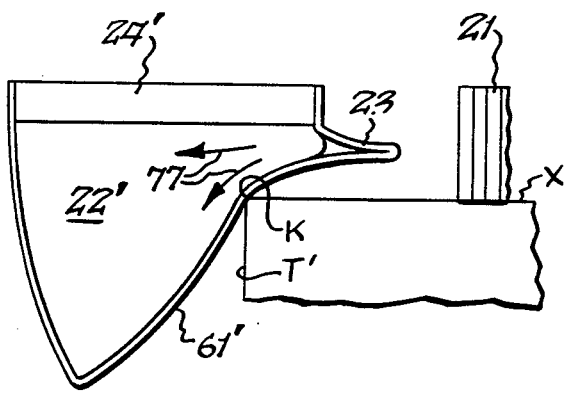
FIG. 19 is a schematic view of the manner in which the side pad of the present invention compresses when it is distorted by the outer edge of an 8½ foot wide truck.
Figure 20:
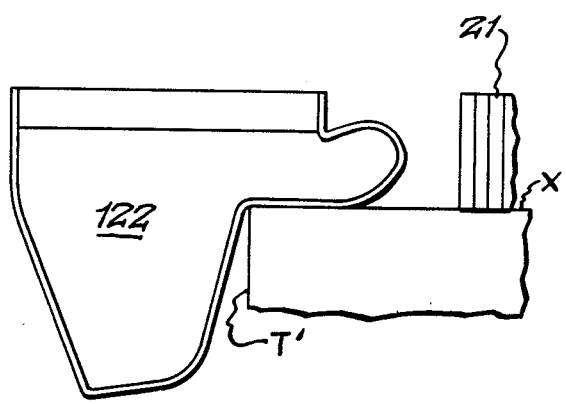
FIG. 20 is a schematic view showing how a prior art side pad distorts when it is compressed by the outer edge of an 8½ foot wide truck.

In FIGS. 19 and 20 the deflection of the core 22' of the present invention (FIG. 19) is compared to the deflection of a prior art core 122 when both are engaged equally by an 8½ foot truck T' which is centered between the pads on opposite sides of a door opening. As can be seen from a comparison of FIGS. 18 and 20, the core 122 is distorted much more severely in FIG. 20 than in FIG. 18, and thus is subject to even faster deterioration. In contrast to the foregoing, the core 22' of FIG. 19 is distorted much less than prior art core 122 of FIG. 20, but more than it is distorted when engaged by an 8 foot wide truck, as in FIG. 17. Still in all, core 22' of FIG. 19 is compressed only slightly more than four inches whereas the core 122 of FIG. 16 has the cross-hatch portion 70 compressed and in addition the portion 76 (FIG. 16) is compressed. As can be seen from FIG. 19, the core 22' is deflected in the direction of arrows 77 because of the angle which side 61' makes with the corner K of the truck.

The foregoing description relative to FIGS. 15-20 has assumed that the trucks deflected both pads on opposite sides of the doorway equally in each instance. However, equal deflection does not occur at all times because the truck is many times offcenter relative to the doorway. Therefore, for example, if the truck T was more to the left in FIGS. 18 and 20, the prior art core 122 would be distorted even more than shown in FIGS. 18 and 20. While the cores 22' of the present invention would also be distorted more than shown in FIGS. 17 and 19 when the truck T was more to the left, the fact remains that the cores 22' would not be as excessively distorted as the prior art cores 122.

Under all conditions of operation, the prior art core 122 is compressed and distorted more than core 22' under equivalent conditions of operation, and therefore core 22' of the present invention is subject to less wear and deterioration.

It can thus be seen that the improved dock seal of the present invention is manifestly capable of achieving the above enumerated objects and while preferred embodiments have been disclosed, it will be appreciated that the present invention is not limited thereto but may be otherwise embodied within the scope of the following claims.

What is claimed is:

1. In a building having a door opening and side wall portions located outside of and to the sides of said door opening, a dock seal construction for sealing the space between the rear of the sides of a truck and said side wall portions, comprising a pair of elongated pad members each having a longitudinal axis, means for securing one of said elongated pad members to each of said side wall portions proximate said door opening with said longitudinal axes being substantially parallel to each other, each of said elongated pad members having a resilient flexible core with a periphery, each of said pad members having first and second sides extending outwardly from its respective side wall portion and each having a third side intersecting said first and second sides and spaced from its respective side wall portion and extending at a slant toward said door opening so as to intersect the rear of the sides of a truck at an acute angle when said pads are in an unstressed condition.

2. In a building as set forth in claim 1 wherein said second sides comprise inner sides adjacent said door opening and intersecting said third sides at an acute angle.

3. In a building as set forth in claim 2 wherein each of said inner sides intersect said side wall portions at an obtuse angle.

4. In a building as set forth in claim 1 wherein each of said elongated pad members are quadrangular in cross section.

5. In a building as set forth in claim 4 wherein each of said pad members include a fourth side opposite to said third side for placement in contiguous relationship to said side wall portions, said first side being substantially perpendicular to said fourth side and extending between said third side and said fourth side, and said second side extending at an obtuse angle to said fourth side and extending between said third side and said fourth side.

6. In a building as set forth in claim 5 wherein said pad members include an elongated board at each of said second sides, casing means in contiguous relationship to said inclined side and said first and second sides of each of said cores, and means securing said casings of each of said pad members to its respective board.

7. A pad member for a dock seal construction for sealing the space between the rear of a truck and the wall of a building surrounding a door opening comprising an elongated pad member having a longitudinal axis, said elongated pad member including a resilient flexible core with a periphery, said pad member having four sides, with first and second of said sides being substantially perpendicular to each other and third and fourth sides being at an acute angle relative to each other, said third side also being at an acute angle relative to said second side, and said fourth side being at an obtuse angle relative to said first side.

8. A pad member as set forth in claim 7 including a casing in contiguous relationship to said second, third and fourth sides.

9. A pad member as set forth in claim 8 including an elongated board in contiguous relationship to said first side, and means securing said casing to said elongated board.

10. A pad member as set forth in claim 9 wherein said core comprises plastic foam material.

* * * * *